April 21, 1970   J. H. SMITH   3,507,172
NUT AND BOLT STARTERS
Filed Nov. 28, 1967
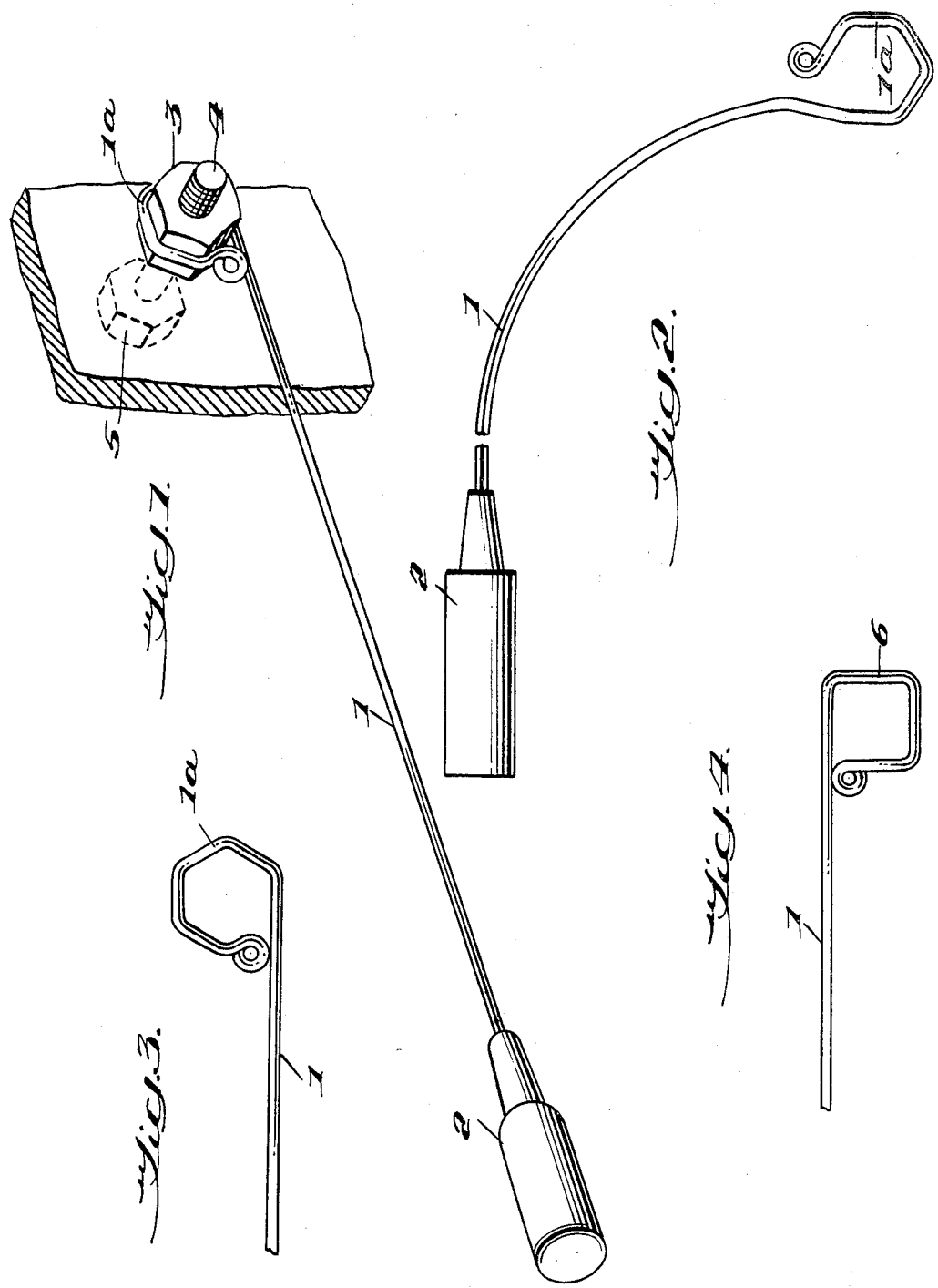
INVENTOR
JAMES HOWARD SMITH,
BY J. Austin Stone
ATTORNEY 3,507,172
NUT AND BOLT STARTERS
James H. Smith, Covington, Ga. 30209
Filed Nov. 28, 1967, Ser. No. 686,219
Int. Cl. B25b 9/00
U.S. Cl. 81—13          2 Claims

ABSTRACT OF THE DISCLOSURE

The tool is designed to enable the user to fit nuts to bolts and vice versa while working in cramped quarters, such as those too crowded for a man to insert an arm or hold a wrench or socket device. The essential features of this tool are a rod-like flexible shaft of suitable length, a handle at one end of the shaft, and at the opposite end a nut or bolt head engaging element such as the substantially closed loop. Such an element may be formed of an extension of the shaft or the shaft may carry a socket or other device to receive and hold a nut or bolt head.

---

This invention is directed to a tool for the convenient handling of nuts and bolts when those articles are to be held in cramped or crowded quarters to be fitted with correspondingly threaded bolts or nuts. Frequently it happens that a mechanic's hands do not permit him to reach in through hand holes or around the edge of a partition or plate to hold a nut or bolt while its complementary member is affixed to it or threaded in position. The device of this invention is adapted to avoid such situations and to facilitate the holding of nuts or bolts with the maximum of convenience.

The device includes a substantial length of rod-like shaft adapted to be used straight or bent into suitable shape depending on the nature of the task at hand. This shaft may carry a handle at one end large enough for the convenient gripping by the mechanic's hand. At the opposite end from the handle the rod is provided with means for gripping a nut or the head of a bolt. This element should be hexagonal in shape if the nut or bolt head being used are of hexagonal shape. The work engaging portion of the tool may most conveniently be formed by the material of the shaft recurved to constitute a substantially closed loop and that end portion should have sufficient tensile strength to resist inadvertent opening of the loop. In other words, the work object holding portion should be adapted to fit a nut or bolt head of substantially the same size as the inner contour of the loop.

The shaft should have been heat treated to permit it to be bent into suitable shape by the mechanic but the end portion for holding the work should resist inadvertent opening.

The foregoing and additional features are described and claimed somewhat more fully in the following and are illustrated in the accompanying drawing, in which:

FIGURE 1 is a perspective view of the tool having a shaft, a handle and the element at the far end from the handle for gripping a nut or bolt head;

FIGURE 2 is a view showing the shaft curved, the working end having a hexagonal shape for a convenient gripping of a nut or bolt head of hexagonal shape;

FIGURE 3 shows the working head of the tool illustrated in FIGURE 1 but looking directly at the side of the tool; and FIGURE 4 is a modification of the working end of the tool as adapted to receive and fit a square headed nut or bolt head.

Referring in detail to the drawing, there is shown in FIGURE 1 a view in perspective illustrating how the tool is used. The tool has a shaft 1 and a handle 2 at one end of the shaft. At the opposite end from the handle the shaft is formed into an open ended loop, the metal of the shaft being recurved on itself and formed into the shape of a hexagonal so as to receive and fairly tightly hold a hexagonal nut or bolt head. FIGURE 1 shows the loop of the tool extending around a hexagonal nut which is shown mounted on the shank of a bolt, the head of which bolt is on the opposite side of a plate from the nut on which the recurved end of the tool is fitted. The bolt head in this instance is shown in dotted lines thus to indicate that it is behind the metal plate. Referring again to FIGURE 1, the recurved work engaging portion or extension of the shaft 1 is indicated at 1a and is of one piece construction with said shaft 1. As shown in all figures, the tip of the extension 1a is reversely bent on itself which obviously prevents inadvertently hooking other parts during use. The nut is identified by the character 3 and the bolt shank by the character 4 and the bolt head by the character 5. Similar reference characters are used for identifying like parts in the other figures of the drawing.

In FIGURE 4, the end of the shaft 1 is bent into a rectangular shape 6 suitable for engaging the periphery of a square shaped nut or bolt head.

From the foregoing, it will be understood that the tool is adapted for the use of a mechanic to enable him to hold a nut or a bolt head in position for the reception of a complementary bolt shank or to hold a bolt head and shank for the reception of a matching nut. It will also be obvious that this tool is for the temporary convenience of the worker while attempting to match up complementary threaded parts. For this reason the tool is identified as a nut and bolt starter.

Preferably the shaft of the tool is made of spring wire suitable for musical instruments of a size 0.090 with a tolerance of 0.002±. A suitable length from the handle to the nut gripping end is 13 inches. The shaft should be heat treated so that it will hold its flexibility.

I claim:

1. A tool for facilitating the starting of nuts and bolts comprising an elongated rod-like flexible shaft having a handle at one end and at the opposite end a work engaging element adapted to fit over a nut or bolt head, said shaft being adapted to be inserted into cramped working spaces to hold a nut or bolt head while the complementary member is being fitted, said shaft and said work engaging element being of one piece construction, said element being an extension of said shaft and in the shape of a substantially closed loop, the tensile strength of said element being sufficient to prevent said loop from inadvertently opening during use.

2. The combination of claim 1 wherein said work engaging element further includes a reversely directed closed bend at the tip thereof.

References Cited

UNITED STATES PATENTS

| 1,051,562 | 1/1913 | Crolla | 81—64 |
| 3,203,285 | 8/1965 | Schmidt. | |
| 3,232,148 | 2/1966 | Dearing | 81—13 |

LESTER M. SWINGLE, Primary Examiner

R. V. PARKER, Jr., Assistant Examiner